United States Patent [19]
Pistriotto et al.

[11] Patent Number: 6,138,162
[45] Date of Patent: *Oct. 24, 2000

[54] METHOD AND APPARATUS FOR CONFIGURING A CLIENT TO REDIRECT REQUESTS TO A CACHING PROXY SERVER BASED ON A CATEGORY ID WITH THE REQUEST

[75] Inventors: Joseph C. Pistriotto; Katrina Montinola, both of Belmont, Calif.

[73] Assignee: PointCast, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/797,724

[22] Filed: Feb. 11, 1997

[51] Int. Cl.⁷ .................................................. G06F 15/16

[52] U.S. Cl. ............................................ 709/229; 709/218

[58] Field of Search ..................... 395/200.54, 200.55, 395/200.59, 200.48; 709/224, 225, 229, 218

[56] References Cited

U.S. PATENT DOCUMENTS

| | | | |
|---|---|---|---|
| 3,848,193 | 11/1974 | Martin et al. | 325/53 |
| 3,987,398 | 10/1976 | Fung | 325/309 |
| 4,170,782 | 10/1979 | Miller | 358/84 |

(List continued on next page.)

FOREIGN PATENT DOCUMENTS

| | | |
|---|---|---|
| 0113022 | 11/1984 | European Pat. Off. . |
| 2034995 | 6/1980 | United Kingdom . |
| 2141907 | 1/1985 | United Kingdom . |
| 2185670 | 7/1987 | United Kingdom . |
| 2207314 | 1/1989 | United Kingdom . |
| 2256549 | 12/1992 | United Kingdom . |
| 2281434 | 3/1995 | United Kingdom . |
| 8804507 | 6/1988 | WIPO . |
| 9007844 | 7/1990 | WIPO . |
| 9212488 | 7/1992 | WIPO . |
| 9309631 | 5/1993 | WIPO . |
| 9319427 | 9/1993 | WIPO . |
| 9531069 | 11/1995 | WIPO . |
| 9630864 | 10/1996 | WIPO . |
| 9634466 | 10/1996 | WIPO . |

OTHER PUBLICATIONS

Patrick McKenna, "COMDEX–Moon Valley's NetCruiser CD and more," Newsbytes, Nov. 16, 1994, Copyright Newsbytes, Inc. 1997, 1pg.

Karen Rodriquez, "Individual to tap Internet with an agent–based news service," Info World, Oct. 24, 1994, vol. 16, No. 43, 1994, pp. 58.

Rebecca Rohan, "In Your Face makes you a star—okay, a screen saver," Computer Shopper, May 1994, vol. 14, No. 5, pp. 767, Copyright Coastal Associates Publishing LP 1994.

Daniel Grotta, et al., "PhotoGenix creates screen–saver slide shows," PC Magazine, vol. 13, No. 16, pp. 52, Sep. 27, 1994, Copyright Ziff–Davis Publishing Company 1994.

*Primary Examiner*—Zarni Maung
*Assistant Examiner*—Andrew Caldwell
*Attorney, Agent, or Firm*—Blakely, Sokoloff, Taylor & Zafman LLP

[57] ABSTRACT

A computer network including a client, at least one caching proxy server, and a destination computer is described. In a specific embodiment, a client computer may request particular types of information by including a category ID in request messages. In order to reduce network traffic, the destination computer may redirect the client's request messages to a caching proxy server, which is preferably located behind the same firewall or gateway as the client. The destination computer may initiate the redirection of client computer requests after receiving an HTTP proxy_GET request message from the client. The destination computer sends a message to the caching proxy server specifying the categories of request that the client computer will direct to the caching proxy server. The proxy server forwards this message to the client computer. The client computer uses the information contained in this message to direct requests messages to a specific caching proxy server based on a category ID.

15 Claims, 15 Drawing Sheets

U.S. PATENT DOCUMENTS

| | | | |
|---|---|---|---|
| 4,186,413 | 1/1980 | Mortimer | 358/146 |
| 4,224,644 | 9/1980 | Lewis et al. | 360/72.2 |
| 4,287,592 | 9/1981 | Paulish et al. | 370/88 |
| 4,288,809 | 9/1981 | Yabe | 358/12 |
| 4,305,101 | 12/1981 | Yarbrough et al. | 360/69 |
| 4,307,446 | 12/1981 | Barton et al. | 364/200 |
| 4,338,644 | 7/1982 | Staar | 360/132 |
| 4,347,498 | 8/1982 | Lee et al. | 340/825.02 |
| 4,381,522 | 4/1983 | Lambert | 358/86 |
| 4,405,946 | 9/1983 | Knight | 358/192.1 |
| 4,429,385 | 1/1984 | Cichelli et al. | 370/92 |
| 4,476,488 | 10/1984 | Merrell | 358/86 |
| 4,477,695 | 10/1984 | Buck | 178/3 |
| 4,488,179 | 12/1984 | Kruger et al. | 358/181 |
| 4,519,029 | 5/1985 | Thompson | 364/200 |
| 4,536,791 | 8/1985 | Campbell et al. | 358/122 |
| 4,575,579 | 3/1986 | Simon et al. | 178/4 |
| 4,587,514 | 5/1986 | Schas et al. | 340/347 |
| 4,602,279 | 7/1986 | Freeman | 358/86 |
| 4,641,205 | 2/1987 | Beyers, Jr. | 360/33.1 |
| 4,645,873 | 2/1987 | Chomet | 379/93 |
| 4,677,434 | 6/1987 | Fascenda | 380/23 |
| 4,677,466 | 6/1987 | Lert, Jr. et al. | 358/84 |
| 4,691,351 | 9/1987 | Hayashi et al. | 380/10 |
| 4,691,354 | 9/1987 | Palminteri | 380/15 |
| 4,701,794 | 10/1987 | Froling et al. | 358/147 |
| 4,703,423 | 10/1987 | Bado et al. | 364/400 |
| 4,706,121 | 11/1987 | Young | 358/142 |
| 4,722,005 | 1/1988 | Ledenbach | 358/168 |
| 4,745,559 | 5/1988 | Willis et al. | 364/514 |
| 4,751,578 | 6/1988 | Reiter et al. | 358/183 |
| 4,751,669 | 6/1988 | Sturgis et al. | 364/900 |
| 4,768,110 | 8/1988 | Dunlap et al. | 360/33.1 |
| 4,775,935 | 10/1988 | Yourick | 364/401 |
| 4,788,682 | 11/1988 | Vij et al. | 370/110.1 |
| 4,814,972 | 3/1989 | Winter et al. | 364/200 |
| 4,815,030 | 3/1989 | Cross et al. | 364/900 |
| 4,821,102 | 4/1989 | Ichikawa | 358/183 |
| 4,823,122 | 4/1989 | Mann et al. | 340/825.28 |
| 4,829,569 | 5/1989 | Seth-Smith et al. | 380/10 |
| 4,866,700 | 9/1989 | Berry et al. | 370/58.1 |
| 4,868,866 | 9/1989 | Williams, Jr. | 380/49 |
| 4,873,662 | 10/1989 | Sargent | 364/900 |
| 4,890,321 | 12/1989 | Seth-Smith et al. | 380/20 |
| 4,899,394 | 2/1990 | Lee | 382/9 |
| 4,908,707 | 3/1990 | Kinghorn | 358/147 |
| 4,908,713 | 3/1990 | Levine | 358/335 |
| 4,974,149 | 11/1990 | Valenti | 364/200 |
| 4,975,904 | 12/1990 | Mann et al. | 370/85.1 |
| 4,977,455 | 12/1990 | Young | 358/142 |
| 4,987,496 | 1/1991 | Greivenkamp, Jr. | 358/448 |
| 4,991,011 | 2/1991 | Johnson et al. | 358/141 |
| 4,992,940 | 2/1991 | Dworkin | 364/401 |
| 4,994,908 | 2/1991 | Kuban et al. | 358/86 |
| 4,994,909 | 2/1991 | Graves et al. | 358/86 |
| 5,001,554 | 3/1991 | Johnson et al. | 358/86 |
| 5,008,853 | 4/1991 | Bly et al. | 364/900 |
| 5,053,883 | 10/1991 | Johnson | 358/349 |
| 5,058,108 | 10/1991 | Mann et al. | 370/85.1 |
| 5,075,771 | 12/1991 | Hashimoto | 358/84 |
| 5,077,607 | 12/1991 | Johnson et al. | 358/86 |
| 5,099,319 | 3/1992 | Esch et al. | 358/86 |
| 5,105,184 | 4/1992 | Pirani et al. | 340/721 |
| 5,131,020 | 7/1992 | Liebesny et al. | 379/59 |
| 5,133,075 | 7/1992 | Risch | 395/800 |
| 5,151,789 | 9/1992 | Young | 358/194.1 |
| 5,177,680 | 1/1993 | Tsukino et al. | 364/401 |
| 5,182,640 | 1/1993 | Takano | 358/86 |
| 5,187,787 | 2/1993 | Skeen et al. | 395/600 |
| 5,200,823 | 4/1993 | Yoneda et al. | 358/146 |
| 5,220,420 | 6/1993 | Hoarty et al. | 358/86 |
| 5,220,501 | 6/1993 | Lawlor et al. | 364/408 |
| 5,220,657 | 6/1993 | Bly et al. | 395/425 |
| 5,230,048 | 7/1993 | Moy | 395/600 |
| 5,231,493 | 7/1993 | Apitz | 358/146 |
| 5,261,042 | 11/1993 | Brandt | 395/156 |
| 5,265,033 | 11/1993 | Vajk et al. | 364/514 |
| 5,276,869 | 1/1994 | Forrest et al. | 395/600 |
| 5,283,639 | 2/1994 | Esch et al. | 348/6 |
| 5,283,731 | 2/1994 | Lalonde et al. | 364/401 |
| 5,285,272 | 2/1994 | Bradley et al. | 348/6 |
| 5,301,028 | 4/1994 | Banker et al. | 348/570 |
| 5,305,195 | 4/1994 | Murphy | 364/401 |
| 5,319,455 | 6/1994 | Hoarty et al. | 348/7 |
| 5,319,707 | 6/1994 | Wasilewski et al. | 380/14 |
| 5,321,750 | 6/1994 | Nadan | 380/20 |
| 5,327,554 | 7/1994 | Palazzi, III et al. | 395/600 |
| 5,337,155 | 8/1994 | Cornelis | 348/473 |
| 5,339,239 | 8/1994 | Manabe et al. | 364/401 |
| 5,343,300 | 8/1994 | Hennig | 348/478 |
| 5,345,594 | 9/1994 | Tsuda | 455/18 |
| 5,347,632 | 9/1994 | Filepp et al. | 395/200 |
| 5,353,218 | 10/1994 | De Lapa et al. | 364/401 |
| 5,355,490 | 10/1994 | Kou | 395/700 |
| 5,357,276 | 10/1994 | Banker et al. | 348/7 |
| 5,361,393 | 11/1994 | Rossillo | 395/650 |
| 5,379,383 | 1/1995 | Yunoki | 395/325 |
| 5,379,421 | 1/1995 | Palazzi, III et al. | 395/600 |
| 5,404,505 | 4/1995 | Levinson | 395/600 |
| 5,414,773 | 5/1995 | Handelman | 380/49 |
| 5,426,427 | 6/1995 | Chinnock et al. | 340/827 |
| 5,426,594 | 6/1995 | Wright et al. | 364/514 |
| 5,428,606 | 6/1995 | Moskowitz | 370/60 |
| 5,434,978 | 7/1995 | Dockter et al. | 395/200 |
| 5,438,355 | 8/1995 | Palmer | 348/1 |
| 5,442,771 | 8/1995 | Filepp et al. | 395/650 |
| 5,446,919 | 8/1995 | Wilkins | 455/6.2 |
| 5,448,262 | 9/1995 | Lee et al. | 345/212 |
| 5,465,401 | 11/1995 | Thompson | 455/89 |
| 5,471,629 | 11/1995 | Risch | 395/800 |
| 5,473,143 | 12/1995 | Vak et al. | 235/380 |
| 5,475,740 | 12/1995 | Biggs, Jr. et al. | 379/91 |
| 5,479,472 | 12/1995 | Campana, Jr. et al. | 379/58 |
| 5,483,466 | 1/1996 | Kawahara et al. | 364/514 C |
| 5,485,370 | 1/1996 | Moss et al. | 364/408 |
| 5,491,820 | 2/1996 | Belove et al. | 395/600 |
| 5,493,677 | 2/1996 | Balogh et al. | 395/600 |
| 5,498,003 | 3/1996 | Gechter | 273/434 |
| 5,511,160 | 4/1996 | Robson | 395/162 |
| 5,512,935 | 4/1996 | Majeti et al. | 348/9 |
| 5,515,098 | 5/1996 | Carles | 348/8 |
| 5,517,605 | 5/1996 | Wolf | 395/155 |
| 5,524,146 | 6/1996 | Morrisey et al. | 379/207 |
| 5,528,490 | 6/1996 | Hill | 364/403 |
| 5,557,721 | 9/1996 | Fite | 395/148 |
| 5,559,868 | 9/1996 | Blonder | 379/96 |
| 5,577,266 | 11/1996 | Takahisa et al. | 455/66 |
| 5,579,471 | 11/1996 | Barber et al. | 395/326 |
| 5,579,537 | 11/1996 | Takahisa | 455/66 |
| 5,583,563 | 12/1996 | Wanderscheid et al. | 348/13 |
| 5,584,025 | 12/1996 | Keithley et al. | 395/615 |
| 5,600,366 | 2/1997 | Schulman | 348/9 |
| 5,604,542 | 2/1997 | Dedrick | 348/552 |
| 5,614,940 | 3/1997 | Cobbley et al. | 348/7 |
| 5,617,565 | 4/1997 | Augenbraun et al. | 395/604 |
| 5,708,780 | 1/1998 | Levergood et al. | 395/200.59 |
| 5,740,549 | 4/1998 | Reilly et al. | 705/15 |
| 5,748,190 | 5/1998 | Kjorsvik | 345/329 |
| 5,751,956 | 5/1998 | Kirsch | 395/200.33 |
| 5,768,528 | 6/1998 | Stumm | 395/200.61 |
| 5,784,564 | 7/1998 | Camaisa et al. | 395/200.54 |
| 5,809,242 | 9/1998 | Shaw et al. | 395/200 |

| | | | |
|---|---|---|---|
| 5,819,284 | 10/1998 | Farber et al. | 707/104 |
| 5,896,506 | 4/1999 | Ali et al. | 709/213 |
| 5,959,621 | 9/1999 | Nawaz et al. | 345/329 |

OTHER PUBLICATIONS

Journal Article, "Inovation That Has a Purpose Is Called Key to Technology Success Anonymous," Marketing News vol. 22, No. 6, Mar. 14, 1988, pp. 37,40.

Inglesby, T., journal article, "Manufacturing Systems Supplement," Oct. 1992, pp.6–10.

Flynn, M., et al., "The Daily Me: Laying Out Tomorrow's (electronic) News," PC Magazine, vol. 12, No. 15, Sep. 14, 1993, pp. 29.

David Morgenstern, "Farcast service broadcasts instant info via the Internet: database use "droids" to process new items," PC Week, Aug. 29, 1994, vol. 11, No. 34, pp. 50 (1994).

Brian Proffit, "Intercast Brings the Web to TV," PC Tech/Internet Tools, Jan. 21, 1997, pp. 203–204.

Ped Software Corporation, Journalist, "For a Window on a New World of News," 1994, pp. 1–4.

Diaz, et al., "Rule Management in Object Oriented Databases: A Uniform Approach," Barcelona, Spain, Sep. 1991, pp. 317–326.

"Monitoring Corporate Information With First Floor Products," World Wide Web, Nov. 30, 1996.

Risch, T., "Monitoring Database Objects," Amsterdam, 1989, pp444–453.

McKenzie, G.A., "ORACLE–An Information Broadcasting Service Using Data Transmission in the Vertical Interval," Journal of the SMPTE vol. 83, Jan. 1974, pp 5–10.

Schroeder, et al., "Experience with Grapevine: The Growth of a Distributed System," ACM Transactions on Computer Systems, vol. 2, No. 1, Feb. 1984, pp 3–23.

Roizen, J., "Teletext in the USA," SMPTE Journal, vol. 90, No. 7, Jul. 1981, pp 602–610.

James, A., "ORACLE–Broadcasting the Written Word," Wireless World, vol. 79, No. 1453, Jul. 1973, pp 314–316.

Phillips, R., Mediaview: "A General Multimedia Digital Publication System," Communications of the ACM, Jul. 1991, vol. 34, No. 7, pp 75–83.

Forsdick, et al., "Initial Experience with Multimedia Documents in Diamond," 1984, pp 99–113.

Birman, et al., "Exploiting Virtual Synchrony in Distributed Systems," Operating Systems Principles, 1997, pp 123–138.

Bulterman, et al., "A Structure For Transportable, Dynamic Multimedia Documents," USENIX, 1992, pp 137–155.

InterTect, Ltd., "Health & Science News," Hyper Texxt Newzz, 1996.

Kass, A., "A Interchange Standard and System for Browsing Digital Docvments," 1995, pp 1–105.

Avalos, G., "PointCasat to team with Microsoft, add new Net dimension," Contra Costa Times, Dec. 12, 1996, pp 1C, 5C.

Bank, D., "Microsoft Picks On–Line News From Point-Cast," The Wall Street Journal, Marketplace, Dec. 12, 1996.

"Microsoft to Expand Its Internet Reach," Los Angeles Times, Dec. 12, 1996.

Postel, et al., "The ISI Experimental Multimedia Mail System," ISI Research Report, Sep. 1986, pp 1–27.

Huang, et al., "Multimedia E–mail: the Evolution Approach Based on Adapters," Feb. 1994, pp 785–800.

Phillips, R., "An Interpersonal Multimedia Visualization System," IEEE Computer Graphics & Applications, May 1991, pp 20–27.

Srinivas Ramanathan, et al., "Architectures for Personalized Multimedia," IEEE Multimedia, Spring 1994, pp 37–46.

Dunkin, A., "PC Meets TV: The Plot Thickens," Personal Business Week, Dec. 23, 1996, pp 94–95.

Dieberger, A., "Browsing the WWW by interacting with a textual virtual enviroment—A framework for experimenting with navigational metaphors," 1996, pp 170–179.

Ramanathan, et al., "Towards personalized multimedia dial–up services," Computer Networks and ISDN Systems, 1994, pp 1305–1322.

Borenstein, N., "Multimedia Electronic Mail: Will the Dream Become a Reality?" Communications of the ACM, Apr. 1991, vol. 34, No. 4, pp 117–119.

Zuckerman, L., "Pushing the Envelope on Delivery of Customized Internet," New York Times, Dec. 9, 1996, pp D5.

Yan, et al., "Sift–A Tool for Wide–Area Information dissemination," Unenix Technical conference, Jan. 16–20, 1995– New Orleans, LA, pp177–186.

Story, et al., "The Right Pages Image–Based Electronic Library for Alerting and Browsing," AT&T Bell Laboratories, Sep. 1992, pp 17–25.

Mitchell, G., "Two Free Programs Deliver News to Your PC," PC World, Aug. 1996, p 76.

Corel Draw Users Manual—Version 4.0, pp 1–475, Corel Corporation, 1993.

"A Need–To–Know Basis," Web–master, Oct. 1996.

"Microsoft Cuts deals with 2 firms," San Jose Mercury News, Dec. 12, 1996.

"Microsoft Unites with PointCast at Trade Show," San Francisco Chronicle, Dec. 12, 1996.

"Microsoft and PointCast in Broadcast Alliance," The New York Times, Dec. 12, 1996.

"Big Business at Businesswire.com," INSITE, Web Techniques, Christopher Elliott, pp 95–99, Dec. 1996.

"Microsoft teams with PointCast," The Globe and Mail, Dec. 12, 1996.

Prodigy article, Prodigy Services Company, 1989, pp 1–6.

Patent Abstracts of Japan, "European Patent Office," Abstract date Apr. 12, 1991, Application JP900000018.

"Your Personalized Newspaper for CompServe," Journalist, Ped Software Corporation, 1993, pp 1–143.

Lamont, L., "Synchronization of Multimedia Data for Multimedia News–on–Demand Application," IEEE Journal on Selected Areas in communications, vol. 14, No. 1, Jan. 1996, pp 264–278.

Baer, R., "Tele–Briefs on Novel User–Selectable Real Time News Headline Service for Cable TV," IEEE Transactions on Consumer Electronics, vol. CE–25, No. 3, Jul. 1979, pp 406–408.

Frook, J., "News to the Desktop," Interactive Age, Apr. 1996, pp IA1, 1A8.

Hoffert, E. et al., "The Digital News System at EDUCOM: A Convergence of Interactive Computing, Newspapers, Television and High–Speed Networks," Communications of the ACM, Apr. 1991, vol. 34, No. 4, pp 113–116.

"PointCast Network," Netguide, www.netguidemag.com, Sep. 1996, pp 121.

Patent Abstracts of Japan, "European Patent Office," Patent date Aug. 11, 1994, Application JP930124730.

Patent Abstracts of Japan, "European Patent Office," Abstract date Jan. 20, 1993, Application JP910000887.

Singh, A., "News Servers," PC Magazine, Jan. 21, 1997.

Thimm, H., "Multimedia Enhanced CSCW Teleservice for Wide Area cooperative Authoring of Multimedia Documents," SIGOIS Bulletin, Dec. 1994, vol. 15, No. 2, pp 48–57.

Jackson, S et al, "InterMail: A Prototype Hypermedia Mail System," Dec. 1991 pp 405–409.

Miller, G., et al., "News On–Demand for Multimedia Networks," 1993, pp 383–392.

Barrie, J., et al., "The World Wide Web As An Instructional Tool," Science, vol. 274, Oct. 1996, pp 371–372.

Berst, J., "Push Products Redefine Internet," PC Week, nov. 25, 1996, p 63.

Overton, R., "PiontCast 1.1: More Content for News Junkies," PC World, Jan. 1997, p 102.

Quain, J., "Journalist Delivers Your Own Personalized Newspaper," PC Magazine, vol. 12, No. 17, Oct. 12, 1993, p 49.

Williams, M,. article, "Oracle's Vision of Networked Future," Geneva, Switzerland, Oct. 5, 1995.

Article, "And Now the News—On Your PC Screen," Broadcast Newsbytes News Network, Kanata, Ontario, Canada, Oct. 16, 1995.

Article, "Globe Information To Market NewsEdge in Canada," Newsbytes News Network, Toronto, Ontario, Canada, May 26, 1992.

Article, "There's more to one–way addressability than meets the eye".

Article, "VCR Technology", No. 4 in a series of reports from Mitsubishi R&D, Video Review, Jan. 1989.

Article, "DIP II", The Ultimate Program Guide Unit from the ultimate listings company.

K. Birman, et al., "The ISIS System Manual", By the ISIS Project, Mar. 15, 1988, pp 1–15.

K. Birman, et al., Programming Your Way Out Of The Past ISIS and The Meta Project, Sun Technology, Summer 1989, pp 90–104.

Article, "Specification Of Basic Encoding Rules for Abstract Syntax Noattion One", Fascicle VIII.4–Rec. X.209, Melbourne, 1988, pp131–151.

U. Bensch, "VPV–Video Text Programs Videorecorder", The Phillips Group of Companies, Eindhoven, The Netherlands, Jun. 10, 1988 pp1–5.

F. Schmuck, "ISIS Release", V2.0, May 1990, pp 1–12.

"View Data", The British Library, Chapter 10, Science Reference Library, pp 111–123.

"IBM Technical Disclosure Bulletin", IBM Corporation, Patent Library vol. 28, No. 5, Oct. 1985, pp 2160–2161.

J. Gecael, "The Architecture of Videotex Systems", 1983, pp174–177, pp 233–238.

F. Schneider, "United States District Court Northern District of New York", Rue Walsh & Miller, Attorney's at Law. Nov. 11, 1993.

Professional Group E14 (Television and Sound), Broadcast and Wired Teletext Systems–Ceefax, Oracle, Viewdata, Jan. 13, 1976, pp 2–7.

"Specification of Abstract Syntax Notation One", Fascicle VIII.4–Rec.X.208, Melbourne, 1988, pp 57–130.

K. P. Birman et. al., "ISIS Documentation: Release 1", Jul. 1987, pp 1–89.

K. Birman, et al., "The ISIS System Manual", By The ISIS Project, Jun. 15, 1988, pp1–291.

300 — Private Corporate Agent:

| Category ID | Category Description |
|---|---|
| 66816 | Corporate Data Channel |
| 67072 | Corporate Data Channel News Flash |

310 — AdStats Agent:

| Category ID | Category Description |
|---|---|
| 66080 | Upload/Stats |
| 66081 | Upload/Stats: Encoded |
| 66082 | Upload/Stats: Encoded and Compressed |
| 66083 | Upload/Stats: Incremental |
| 66084 | Upload/Stats: Truncated |

320 — Pass Through Agent

| Category ID | Category Description |
|---|---|
| 65792 | PCN Registration |
| 66048 | Upload/unknown |
| 66064 | Upload/Registration |
| 66096 | Upload/Profile |
| 66112 | Upload: Miscellaneous |
| 66304 | Authentication |
| 66320 | Authentication: For V1.1 |
| 66336 | Authentication: Full Implementation |
| 66560 | Proxy Server |
| 3277056 | Hot Sites: Configuration |
| 4587776 | Web: Configuration |

330 — Redirection Agent:

| | |
|---|---|
| 66560 | Proxy Server |

340 — Administration Agent:

| | |
|---|---|
| 64904 | Empty Cache |

Fig. 3A

Proxy Cache Agent:

| Category ID | Category Description |
|---|---|
| 655616 | News: National |
| 655632 | News: National Summary |
| 655872 | News: International |
| 655888 | News: International Summary |
| 656128 | News: Political |
| 656144 | News: Political Summary |
| 1310976 | Finance: Historic Quotes |
| 1311232 | Finance: Current Quotes |
| 1311488 | Finance: Articles |
| 1966336 | Weather: Maps |
| 1966592 | Weather: Forecast Cities |
| 2621696 | Sports: General News |
| 2621712 | Sports: News Summary |
| 2621952 | Sports: ML Baseball News |
| 2621968 | Sports: ML Baseball Summary |
| 2622208 | Sports: NBA Basketball News |
| 2622224 | Sports: NBA Basketball Summary |
| 2622464 | Sports: M_Coll. Basketball News |
| 2622480 | Sports: M_Coll. Basketball Summary |
| 2622720 | Sports: W_Coll. Basketball News |
| 2622736 | Sports: W_Coll. Basketball Summary |
| 2622976 | Sports: NFL Football News |

| Category ID | Category Description |
|---|---|
| 2626160 | Olympics: Team Standings |
| 2626176 | Olympics: Team Results |
| 2626192 | Olympics: Event Results |
| 2633728 | Sports: Ticker |
| 58998560 | Entertainment: News Summary |
| 3932416 | Version Control: Software |
| 3932432 | Version Control: Ad Pool |
| 3932448 | Version Control: Screen Saver |
| 3997952 | Shadow Version Control: Software |
| 3997968 | Shadow Version Control: Ad Pool |
| 3997984 | Shadow Version Control: Screen Saver |
| 5243136 | Business: General News |
| 5243152 | Business: News Summary |
| 52243392 | Business: Industry News |
| 5898512 | Entertainment: Variety Advisories |
| 58998528 | Entertainment: Variety News |
| 58998544 | Entertainment: Variety Business |
| 58998752 | Entertainment: Horoscopes |
| 5899008 | Entertainment: Lottery |
| 13107200 | LA Times: Front Page |
| 13107456 | LA Times: Nation/World |
| 13107712 | LA Times: State/Local |
| 13107968 | LA Times: Sports |

Fig. 3B(1)

| (A) | |
|---|---|
| 2622992 | Sports: NFL Football Summary |
| 2623232 | Sports: CFL Football News |
| 2623248 | Sports: CFL Football Summary |
| 2623488 | Sports: College Football |
| 2623504 | Sports: College Football Summary |
| 2623744 | Sports: General News |
| 2623760 | Sports: General Summary |
| 2625536 | Sports: Golf and Tennis News |
| 2625552 | Sports: Golf and Tennis Summary |
| 2625792 | Sports: NHL Hockey News |
| 2625808 | Sports: NHL Hockey Summary |
| 2626048 | Sports: Olympic News |
| 2626064 | Olympics: Main Lead |
| 2626080 | Olympics: Medals Tally |
| 2626096 | Olympics: Results Ticker |
| 2626112 | Olympics: Daily Schedule |
| 2626128 | Olympics: Features |
| 2626144 | Olympics: Daily Roundups |

| (B) | |
|---|---|
| 13108224 | LA Times: Business/Technology |
| 13108480 | LA Times: Life/Style |
| 13108736 | LA Times: Calendar |
| 13108992 | LA Times: Commentary |
| 13109264 | LA Times: Daily Photo |
| 13238272 | Boston Globe: Nation/World |
| 13238528 | Boston Globe: Metro/Region |
| 13238784 | Boston Globe: Editorials |
| 13239040 | Boston Globe: Business |
| 13239296 | Boston Globe: Living Arts |
| 13239552 | Boston Globe: Sports |
| 13239808 | Boston Globe: Page One |
| 133369344 | Time Warner: Money |
| 133369360 | Time Warner: Money Photo |
| 133369600 | Time Warner: People |
| 133369616 | Time Warner: People Photo |
| 133369856 | Time Warner: Time |
| 133369872 | Time Warner: Time Photo |

Fig. 3B(2)

1) /FIDO-1/<categoryID>-<LastID>

2) /FIDO-1/NumItm-<number-requested>/<categoryID>-<LastID>/<search-argument>

3) /FIDO-1/NumRef-<number-requested>/<categoryID>-<LastID>/<search-argument>

4) /FIDO-1/<categoryID>-<LastID>/<search-argument>

```
900 ─────────┐    NAME=channel_name
910 ─────────┤    SS_LOGO=logo for SmartScreen
920 ─────────┤    AD_LOGO=logo for advertisement
930 ─────────┤    SS_FILE=chosen SmartScreen for this channel
940 ─────────┘    FLASH_FILE=file that contains the messages
                  that scroll across the ticker tape ; Group #1
950 ─────────┐    GROUP=group_name1
960 ─────────┤    DOC_SUBJECT=subject1_1
970 ─────────┤    DOC_ID=docID1_1
980 ─────────┤    DOC_SUMMARY=html document1_1
990 ─────────┘    DOC_SUMMARY_END
                  DOC_SUMMARY=subject1_2
                  DOC_ID=docID1_2
                  DOC_SUMMARY=html document1_2
                  DOC_SUMMARY_END
                  ...

; Group#N
                  GROUP=group_nameN
                  DOC_SUBJECT=subjectN_1
                  DOC_ID=docIDN_1
                  DOC_SUMMARY=html documentN_1
                  DOC_SUMMARY_END ...
                  DOC_SUBJECT=subjectN_M
                  DOC_ID=docIDN_M
                  DOC_SUMMARY=html documentN_M
                  DOC_SUMMARY_END
```

Fig. 8

METHOD AND APPARATUS FOR CONFIGURING A CLIENT TO REDIRECT REQUESTS TO A CACHING PROXY SERVER BASED ON A CATEGORY ID WITH THE REQUEST

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

1. Field of the Invention

This invention generally relates to improvements in computer systems, and more specifically, to redirecting client communication with a destination server via an intermediate proxy server that are connected via a network.

2. Background of the Invention

An internet is a group of networks and individual computers communicating via a common protocol. The Internet is a world-wide "network of networks" that use the TCP/IP (Transmission Control Protocol/Internet Protocol) protocol suite for communications. TCP/IP is a set of protocols and programs used to interconnect computer networks and to route traffic among different types of computers. These protocols describe allowable data formats, error handling, message passing, and communication standards. Computer systems that use TCP/IP speak a common language, regardless of hardware or operating system differences.

Part of the popularity of the TCP/IP protocol suite is due to its ability to be implemented on top of a variety of communications channels and lower-level protocols such as T1 and X.25, Ethernet, and RS-232-controlled serial lines. Most sites use Ethernet connections at local area networks to connect hosts and client systems, and then connect that network via a Ti line to a regional network (i.e., a regional TCP/IP backbone) that connects to other organizational networks and backbones. Sites customarily have one connection to the Internet, but large sites often have two or more connections. Modem speeds are increasing as new communications standards are being approved, thus versions of TCP/IP that operate over the switched telephone network are becoming more popular. Many sites and individuals use PPP (Point-to-Point Protocol) and SLIP (Serial Line IP), to connect networks and workstations to other networks using the switched telephone network.

Many large networks conform to these protocols, including the Internet. Thousands of computers at universities, government agencies, and corporations are connected to a network that follows the TCP/IP protocols. Any machine on the Internet can communicate with any other. Machines on the Internet are referred to as hosts or nodes and are defined by their Internet (or IP) address.

The Internet was created initially to help foster communication among government-sponsored researchers. Throughout the 1980's, the Internet grew steadily to include educational institutions, government agencies, commercial organizations, and international organizations. In the 1990's, the Internet has undergone phenomenal growth, with connections increasing faster than any other network ever created (including the telephone network). Many millions of users are now connected to the Internet, with roughly half being business users. The Internet is being used as the basis for the National Information Infrastructure (NII).

Many organizations are in the process of connecting to the Internet to take advantage of Internet services and resources.

Businesses and agencies are now using the Internet or considering Internet access for a variety of purposes, including exchanging e-mail, distributing agency information to the public, and conducting research. Many organizations are connecting their existing internal local area networks to the Internet so that local area network workstations can have direct access to Internet services.

Internet connectivity can offer enormous advantages, however security needs to be a major consideration when planning an Internet connection. There are significant security risks associated with the Internet that often are not obvious to new (and existing) users. In particular, intruder activity, as well as vulnerabilities that could assist intruder activity, are widespread. Intruder activity is difficult to predict and at times can be difficult to discover and correct. Many organizations already have lost productive time and money in dealing with intruder activity; some organizations have had their reputations suffer as a result of intruder activity at their sites being publicized.

A firewall system is one technique that has proven highly effective for improving the overall level of site security. A firewall system is a collection of systems and routers logically placed at a site's central connection to a network. A firewall system can be a router, a personal computer, a host, or a collection of hosts, set up specifically to shield a site or intranet from protocols and services that can be abused from hosts outside the intranet. A firewall system is usually located at a higher-level gateway, such as a site's connection to the Internet; however firewall systems can be located at lower-level gateways to provide protection for some smaller collection of hosts or intranets. A firewall forces all network connections to pass through the gateway, where they can be examined and evaluated, and provides other services such as advanced authentication measures to replace simple passwords. The firewall may then restrict access to or from selected systems, or block certain services, or provide other security features. The main purpose of a firewall system is to control access to or from a protected network (i.e., a site). It implements a network access policy by forcing connections to pass through the firewall, where they can be examined and evaluated.

The general reasoning behind firewall usage is that, without a firewall, an intranet's systems expose themselves to inherently insecure services and to probes and attacks from hosts elsewhere on the network. A firewall provides numerous advantages to sites by helping to increase protection from vulnerable services, controlled access to site systems, concentrated security, enhanced privacy, logging and statistics on network use, and misuse policy enforcement. In a firewall-less environment, network security relies totally on host security and all hosts must, in a sense, cooperate to achieve a uniformly high level of security. The larger the intranet, the less manageable it is to maintain all hosts at the same level of security. As mistakes and lapses in security become more common, break-ins occur, not as the result of complex attacks, but because of simple errors in configuration and inadequate passwords.

A firewall provides the means for implementing and enforcing a network access policy. In effect, a firewall provides access control to users and services. Thus, a network access policy can be enforced by a firewall. One problem is that Intranets that have a significant number of clients deployed often overwhelm the throughput capacity of the firewall.

A proxy server in general is a process that provides a cache of items available on other servers which are presumably slower or more expensive to access.

More specifically, a caching proxy server is used for a WorldWide Web server which accepts uniform resource locators (URLs) with a particular prefix. When it receives a request for such a URL, it strips off the prefix and looks for the resulting URL in its local cache. If found, it returns the document immediately, otherwise it fetches it from the remote server on the Internet, saves a copy in the cache and returns it to the requester. The cache will usually have an expiry algorithm which flushes documents according to their age, size, and access history. Caching proxy servers are often implemented to alleviate the problem of firewalls or proxy gateway servers that are overwhelmed by requests.

In comparison, a proxy gateway server is a computer and associated software which will pass on a request for a URL from a Internet browser to an outside server and return the results. This provides clients on Intranets a trusted agent that can access the Internet on their behalf. The proxy gateway is transparent to the client. A proxy gateway is a server that simply forwards requests from clients or other proxies on to another server or proxy. The second server or proxy sees the original proxy as just another HTTP client. When the proxy receives a response to the forwarded request, it simply returns it to the client. An Internet gateway proxy services HTTP requests by translating them into protocols other than HTTP. The reply sent from the remote server to the gateway is likewise translated into HTTP before being forwarded to the user agent.

In HTTP messaging, proxies use the header of the request to indicate the intermediate steps between the user agent and the server (on requests) and between the origin server and the client (on responses). The header is intended to trace transport problems and to avoid request loops.

Furthermore, agents can be implemented on clients or servers which are connected to the Internet. In the client-server model, an agent is the part of the system that performs information preparation and exchange on behalf of a client or server. Especially in the phrase "intelligent agent," it implies an automatic process which can communicate with other agents to perform some collective task on behalf of one or more humans. The term agent is used to describe an automatic computer process that performs an action, such as information preparation or exchange, with no human intervention involved. Examples of Internet agents are brokers, wanderers, spiders, worms and viruses. Agents can facilitate work and coordinate tasks among machines and other agents.

Data is transmitted across the Internet in packets. A packet is a logical grouping of information that includes a header, control information, and a body that usually contains user data. A message may be segmented into a number of packets. When sent from one user to another via the Internet, individual packets may go by different routes and the packets are reassembled into the original message before reaching the destination. This contrasts with circuit switching in which the two users are actually connected by an end-to-end circuit, E.G. telephone network. Packet is the common name for a layer 3 PDU (Physical Data Unit: A unit of information at any given level of the 7-layer OSI protocol stack. Layer 3 PDUs are often called packets while layer 3 PDUs are often called frames) IP datagrams are often called packets.

Packets can be intercepted at any point within a packet-based network unless special security measures are in place. Capturing packets in this manner is known as network "snooping," "packet sniffing," and "promiscuous monitoring." Sniffers are either hardware or software devices that can intercept and capture electronic messages not addressed to it, but rather addressed to another address on a network. Sniffers are a network monitoring tool that can capture data packets and decode them to show protocol data.

Sniffers typically have the capability of capturing every packet on a network and of decoding all seven layers of the OSI protocol model; the physical layer, the datalink layer, the network layer, the transport layer, the session layer, the presentation layer, the application layer. Capture frame selection can be based on several different filters such as protocol content at lower levels, node addresses, destination class, and pattern matching.

Network sniffers typically display network traffic information and performance statistics in real time, and in user-selectable formats. Numeric station addresses are translated to symbolic names or manufacturer ID names. Network activities measured include buffer use, frames accepted, and Kbytes accepted. Counters for activities specific to particular networks may be implemented. Network activity is expressed as frames/second, Kbytes/second, or percentage of network bandwidth utilization. Data collection by a sniffer may be output to printer or stored to disk in either print-file or spread-sheet format.

In addition to the problem of firewalls overwhelmed by requests, distribution of internal communication via an organization's Intranet is often cumbersome and inconvenient to the users of client computers and the administrators of the Intranets.

The Hypertext Transfer Protocol (HTTP) is an application-level protocol for distributed, collaborative, hypermedia information systems. HTTP has been in use by the World-Wide Web since 1990. An HTTP client submits requests to an HTTP server. The server responds by returning a response code and any appropriate data indicated by the original request. HTTP allows an open-ended set of methods that indicate the purpose of a request. A method indicates the operation that the client requests the server to perform. HTTP builds on the discipline of reference provided by the Uniform Resource Identifier (URI), as a location (URL) or name (URN), for indicating the resource to which a method is to be applied. Messages are passed in a format similar to that used by Internet mail as defined by the Multipurpose Internet Mail Extensions (MIME). HTTP is also used as a generic protocol for communication between user agents and proxies/gateways to other Internet systems, including those supported by the SMTP, NNTP, FTP, Gopher, and WAIS protocols. In this way, HTTP allows basic hypermedia access to resources available from diverse applications.

While the set of HTTP methods is open-ended, the HTTP methods GET and HEAD must be supported by all servers that are HTTP-compliant. All other methods are optional. The GET method retrieves information identified by the Request-URI.

The Request-URI is a Uniform Resource Identifier and identifies the resource upon which to apply the request.

Request-URI="*" |absoluteURI|abs_path

The three options for Request-URI are dependent on the nature of the request.

(1) The asterisk "*" means that the request does not apply to a particular resource, but to the server itself, and is only allowed when the method used does not necessarily apply to a resource. One example would be

OPTIONS * HTTP/1.1

(2) The absoluteURI form is required when the request is being made to a proxy. The proxy is requested to forward the request or service it from a valid cache, and return the response. Note that the proxy may forward the request on to another proxy or directly to the server specified by the absoluteURI. In order to avoid request loops, a proxy must be able to recognize all of its server names, including any aliases, local variations, and the numeric IP address. An example Request would be:

GET http://www.w3.org/pub/WWW/TheProject.html HTTP/1.1

All HTTP-compliant servers must accept the absolute URI form in requests, even though HTTP-compliant clients will only generate them in requests to proxies.

(3) The absolute path ("abs_path") of the URI must be transmitted where a resource on an origin server or gateway is identified.

The semantics of the GET method change to a "conditional GET" if the request message includes an If-Modified-Since, If-Unmodified-Since, If-Match, If-None-Match, or If-Range header field as described by IETF publication at http://ds.internic.net/rfc/rfc2068.txt. A conditional GET method requests that data be transferred only under the circumstances described by the conditional header field(s). The conditional GET method is intended to reduce unnecessary network usage by allowing cached entities to be refreshed without requiring multiple requests or transferring data already held by the client.

The above method of specifying GETs is problematic in the complexity of the variations of the GET method.

SUMMARY OF THE INVENTION

The foregoing problems of firewalls overwhelmed by client requests, unwieldy HTTP GET request interfaces to support caching on proxy servers, and inconvenient methods of distributing internal organization communication is overcome by caching frequently requested data on a caching proxy server connected between an intranet's firewall and the intranet clients via a network and that is retrieved by a cache-specific request initiated by storing data specific to the organization on a content-server connected between an intranet's firewall and the intranet clients via a network.

BRIEF DESCRIPTION OF THE DRAWINGS

The above and further advantages of the invention may be better understood by referring to the following description, in conjunction with the accompanying drawings, in which:

FIGS. 3A and 3B represent tables which show which GET requests of each category id are processed by the six caching proxy agents in accordance with a preferred embodiment;

FIG. 8 illustrates the format of the corp.dat file in accordance with a preferred embodiment;

DETAILED DESCRIPTION

Figure 1:
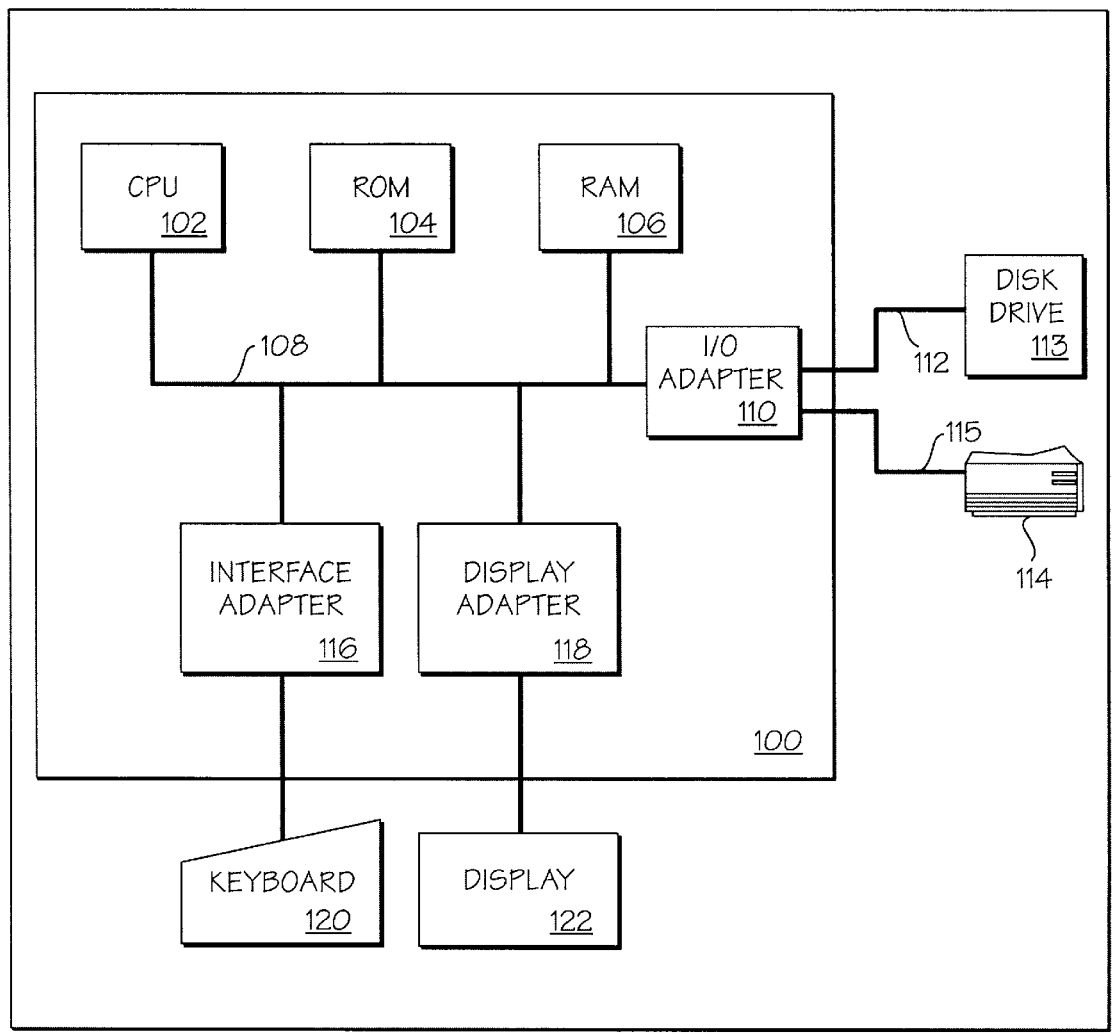
FIG. 1 illustrates a typical hardware configuration of a computer in accordance with the subject invention.

A representative hardware environment is depicted in FIG. 1, which illustrates a typical hardware configuration of a computer 100 in accordance with the subject invention. The computer 100 is controlled by a central processing unit 102 (which may be a conventional microprocessor) and a number of other units, all interconnected via a system bus 108, are provided to accomplish specific tasks. Although a particular computer may only have some of the units illustrated in FIG. 1, or may have additional components not shown, most server computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands, and an input/output (I/O) adapter 110 for connecting peripheral or network devices, such as a disk unit 113 and printer 114, to the bus 108, via cables 115 or peripheral bus 112, respectively. A user interface adapter 116 is also provided for connecting input devices, such as a keyboard 120, and other known interface devices, including mice, speakers, and microphones to the bus 108. Visual output is provided by a display adapter 118 which connects the bus 108 to a display device 122, such as a video monitor. The computer has resident thereon and is controlled and coordinated by operating system software such as the SUN Solaris, Windows NT, or JavaOS operating system.

Figure 2:
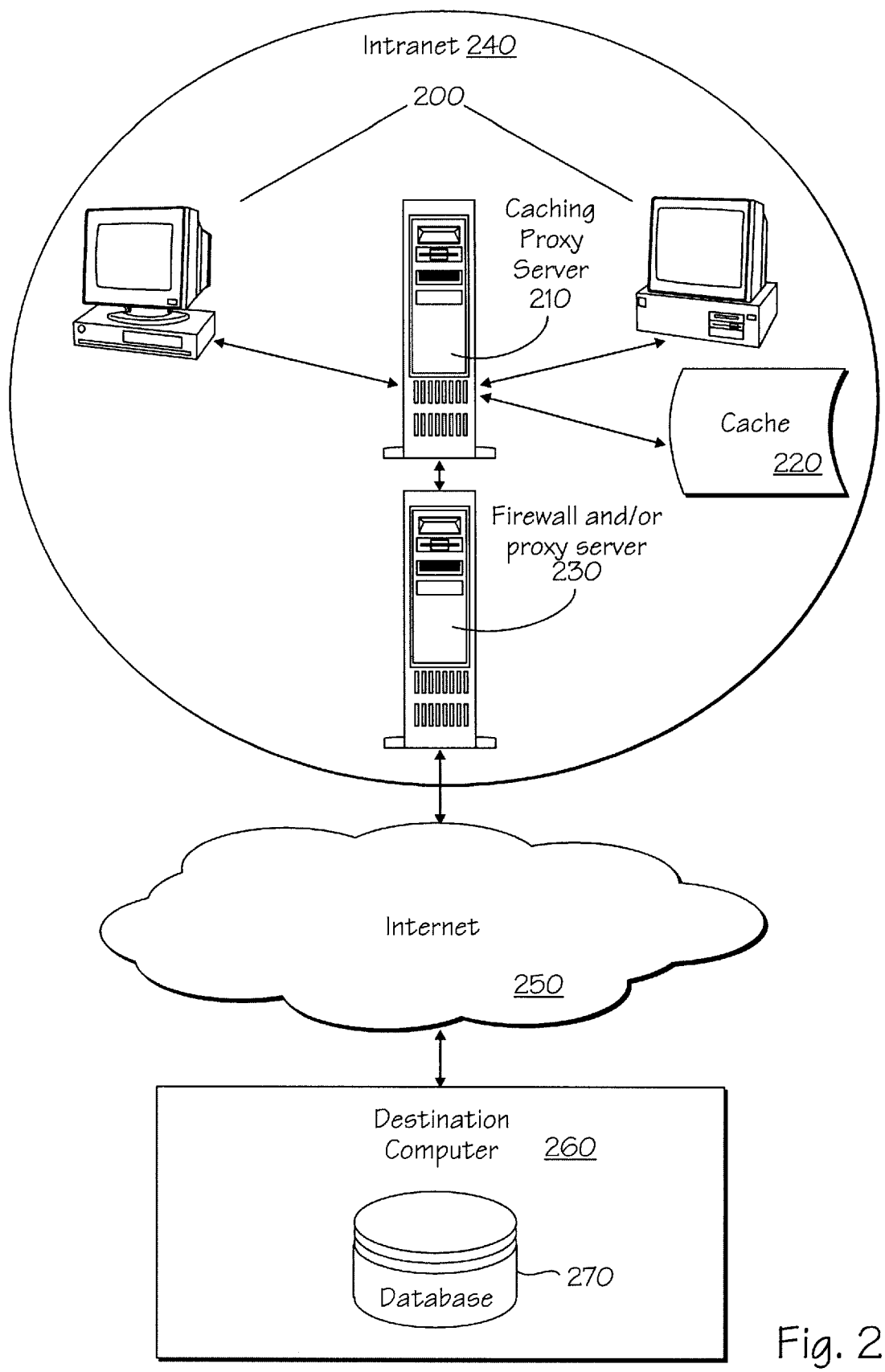
FIG. 2 illustrates the topology of an intranet containing a caching proxy server and firewall connected to the Internet in accordance with a preferred embodiment.

FIG. 2 illustrates the topology of an intranet containing a caching proxy server and firewall connected to the Internet in accordance with a preferred embodiment. Client computers, typically PC-based workstations or UNIX-based workstations 200 communicate to a caching proxy server 210 having a cache of data 220 which communicates to a firewall 230 via a local area network or intranet 240. The intranet 240 communicates to the Internet 250, which communicates to a destination computer 260 having a database 270.

When a caching proxy server 210 having a cache 220 is installed into the intranet 240 and is in operation, six agents will operate on the caching proxy server 210, a corporate agent, an adstats agent, a proxycache agent, a passthrough agent, and an administration agent. All HTTP GET requests from client computers 200 are served by assigned agents on the caching proxy server 210.

When a caching proxy server 210 having a cache 220 is installed into the intranet 240 and is in operation, this event is received and stored by the destination computer 260. To begin operation of the caching proxy server 210, a "proxy_GET" request is sent to the destination computer 260 having a database 270.

The destination computer 260 transmits a table client 200 through to the caching proxy server 210 that identifies which caching proxy server agent will serve a GET request.

FIGS. 3A and 3B represent tables which identify which GET requests of each category id are processed by the six caching proxy agents in accordance with a preferred embodiment. When a GET request is received by the caching proxy server, the category id of the request is examined to determine which agent on the caching proxy server should serve the request. This operation is different than the function of a sniffer because a sniffer examines the protocol content at lower levels, node addresses, destination class. The caching proxy server is examining a different element of the packet, the category id. The caching proxy server is also different from a sniffer in that the caching proxy server intercepts the request and uses the category id to determine which process should server the request, while a sniffer never intercepts the requests.

The Private Corporate Agent 300 serves requests of the Content Server, which is a private internal communication facility. The AdStats Agent 310 serves requests to pass advertisement statistical information to a destination computer. The PassThrough Agent 320 serves requests that are to be passed through to a destination computer, as well as any requests that are not recognized by the caching proxy server. The Redirection Agent 330 serves all "proxy_GET" requests to redirect subsequent client request to another caching proxy server. The Administration Agent 340 serves all system administrative functions, such as deleting the caching proxy server cache. The ProxyCache Agent 350 serves requests to retrieve specific information from the cache in the caching proxy server.

An illustrative embodiment of the invention in a network computing environment is one in which a "Redirection" software agent on a caching proxy server fulfills "proxy_GET" requests from a client by transmitting a list of proxy server(s) within the Intranet of the client that will serve the client, a "Proxycache" agent that will fulfill HTTP GET client requests by either retrieving cached data or passing the request to a "Passthrough" agent that will pass the client request through to the destination server, an "Administration" agent that will process administrative requests from clients, and a "Corporate" agent that will store and distribute internal organization information.

Figure 4:
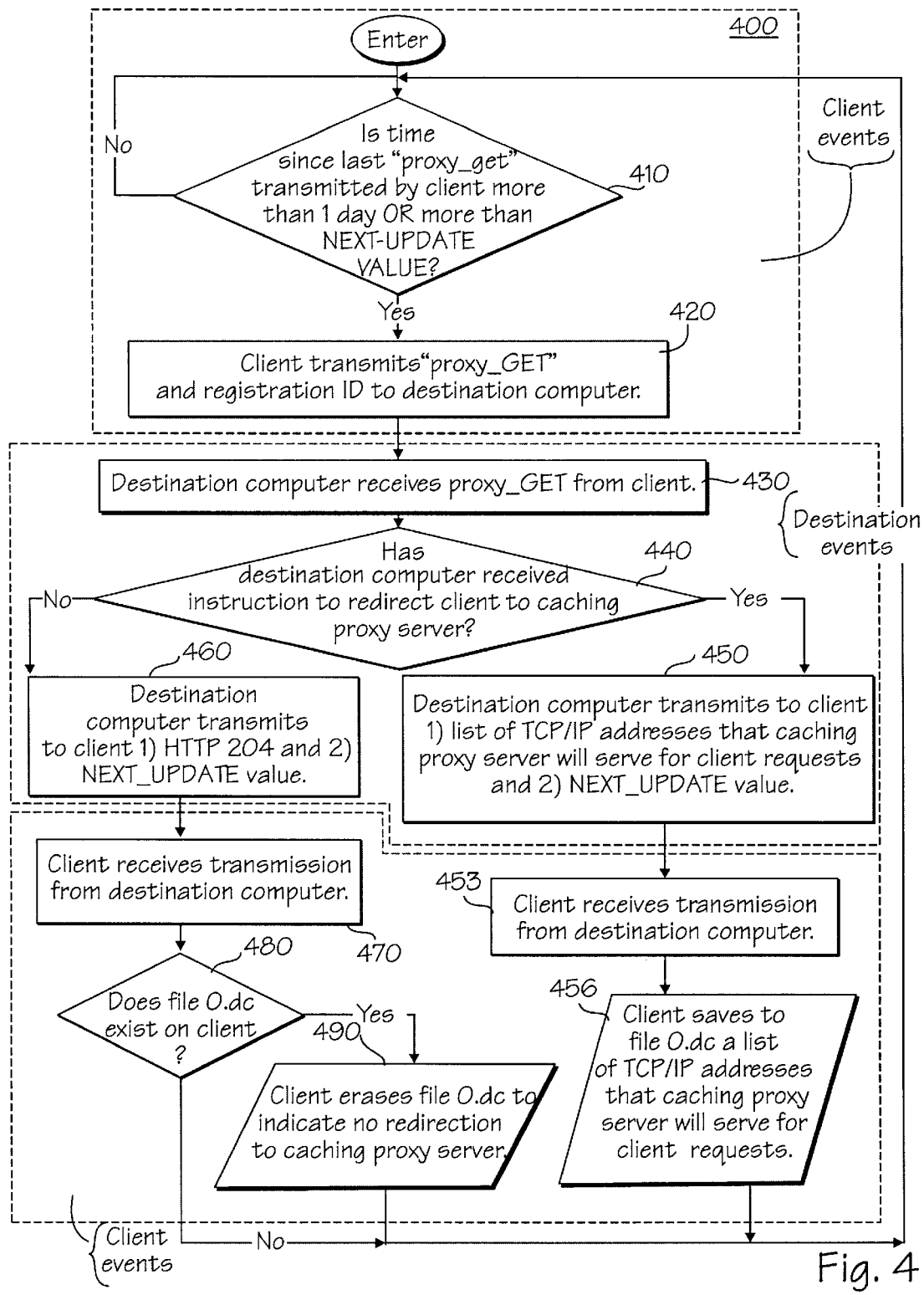
FIG. 4 illustrates the flow-of-control and sequence of events between the client, the caching proxy server and the destination server in regards to a "proxy_GET" request in accordance with a preferred embodiment.

FIG. 4 illustrates the flow-of-control and sequence of events between the client, the caching proxy server and the destination server in regards to a "proxy_GET" request when no caching proxy server is actively serving as a caching proxy server to the client in accordance with a preferred embodiment. The polling loop of events begins 400 on the client computer whereby if the amount of time that has lapsed since the last proxy_GET was transmitted by the client to the destination computer is not greater than one day and if the amount of time that has lapsed since the last proxy_GET was transmitted by the client to the destination computer is not greater than the value set in NEXT_UPDATE 410, then loop 410 is reiterated, otherwise the client transmits a proxy_GET to the destination computer 420.

The destination computer receives the proxy_GET transmission from the client 430. If the destination computer has received instruction to redirect client 200 to caching proxy server 440 then the destination computer transmits to client 1) a list of TCP/IP addresses that the caching proxy server will serve for client requests 2) the NEXT_UPDATE value and 3) a flag indicating whether a private content channel within the intranet is to be enabled by the client 450, the transmission is received by the client 453 and the client saves the list of TCP/IP addresses that the caching proxy server will monitor for client requests to file 0.dc 456. Otherwise, the destination computer transmits to client 1) HTTP 204 indicating that and 2) NEXT_UPDATE value 460 and the client receives the transmission from the destination computer 470 and if a file named "0.dc" exists on the client computer 480 the client erases file 0.dc to indicate no redirection to a caching proxy server is in effect 490. Then the sequence of events returns to the beginning of the loop 400.

Figures 5A, 5B:
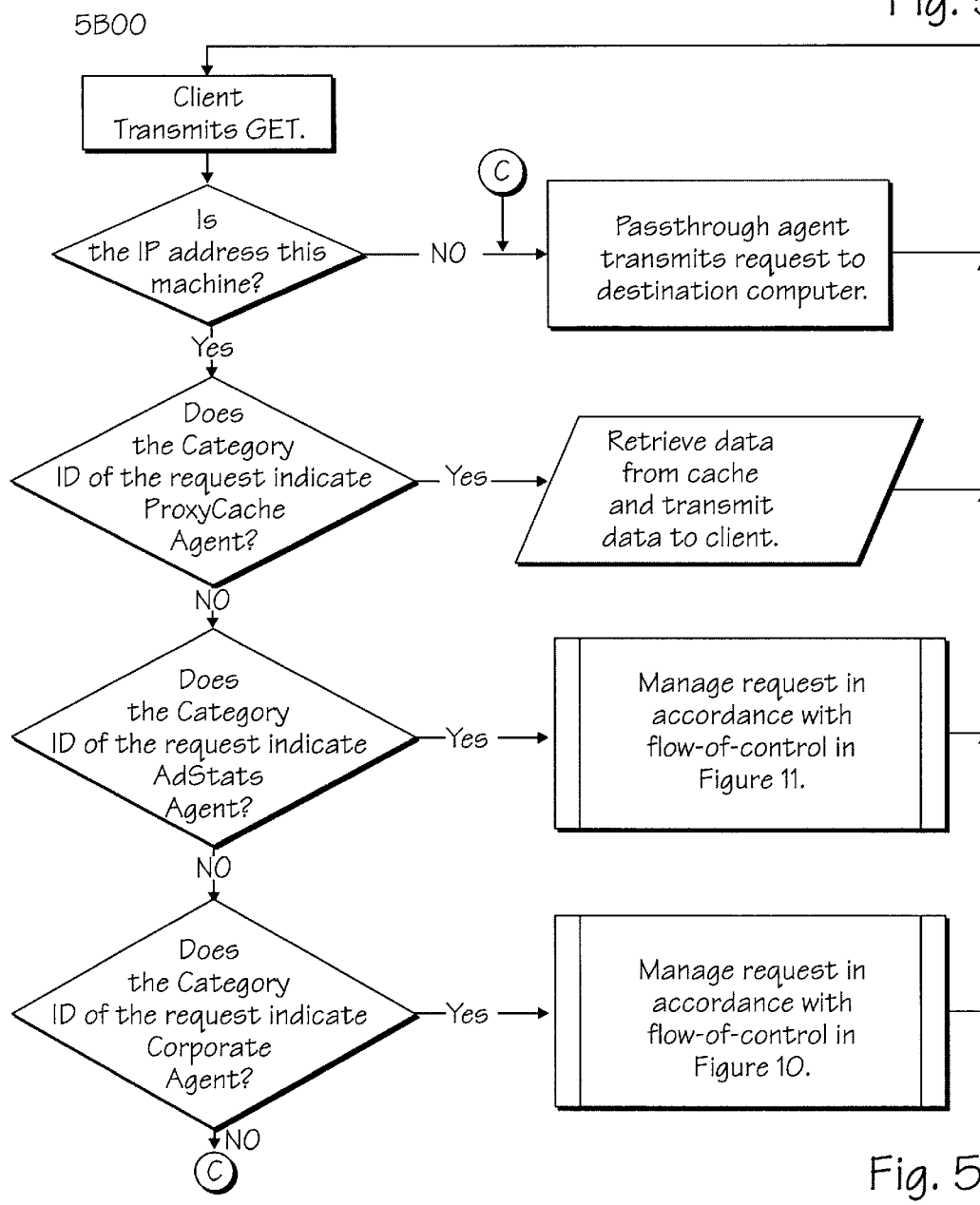
FIG. 5A illustrates formats of HTTP GET requests by a client to a caching proxy server or a destination computer in accordance with a preferred embodiment.
FIG. 5B illustrates the flow-control and sequence of events between the client, the caching proxy server and the destination server in regards to a GET request by the client in accordance with a preferred embodiment.

FIG. 5A illustrates formats of HTTP GET requests by a client to a caching proxy server or a destination computer in accordance with a preferred embodiment.

FIG. 5B illustrates the flow-control and sequence of events between the client, the caching proxy server and the destination server in regards to a GET request by the client in accordance with a preferred embodiment. The client transmits a GET request from the computer at the IP address selected from the 0.dc file 5B00. If the caching proxy server determines that the IP address is for a machine other than the caching proxy server 5B10, the caching proxy server passthrough agent transmits the request to the destination computer 5B20 and the client computer regains flow-of-control 5B00. If the caching proxy server determines that the category ID of the request indicates the proxycache agent 5B30, the caching proxy server retrieves the requested data from the cache and transmits the data to the client 5B40 and the client regains flow-of-control 5B00. If the caching proxy server determines that the category ID of the request indicates the adstats agent 5B50, the caching proxy server manages the request data in accordance with 5B60 and the client regains flow-of-control 5B00. If the caching proxy server determines that the category ID of the request indicates the corporate agent 5B50, the caching proxy server manages the request data in accordance with 5B60 and the client regains flow-of-control 5B00. Otherwise, the caching proxy server passthrough agent transmits the request to the destination computer 5B20 and the client computer regains flow-of-control 5B00.

Figure 6A:
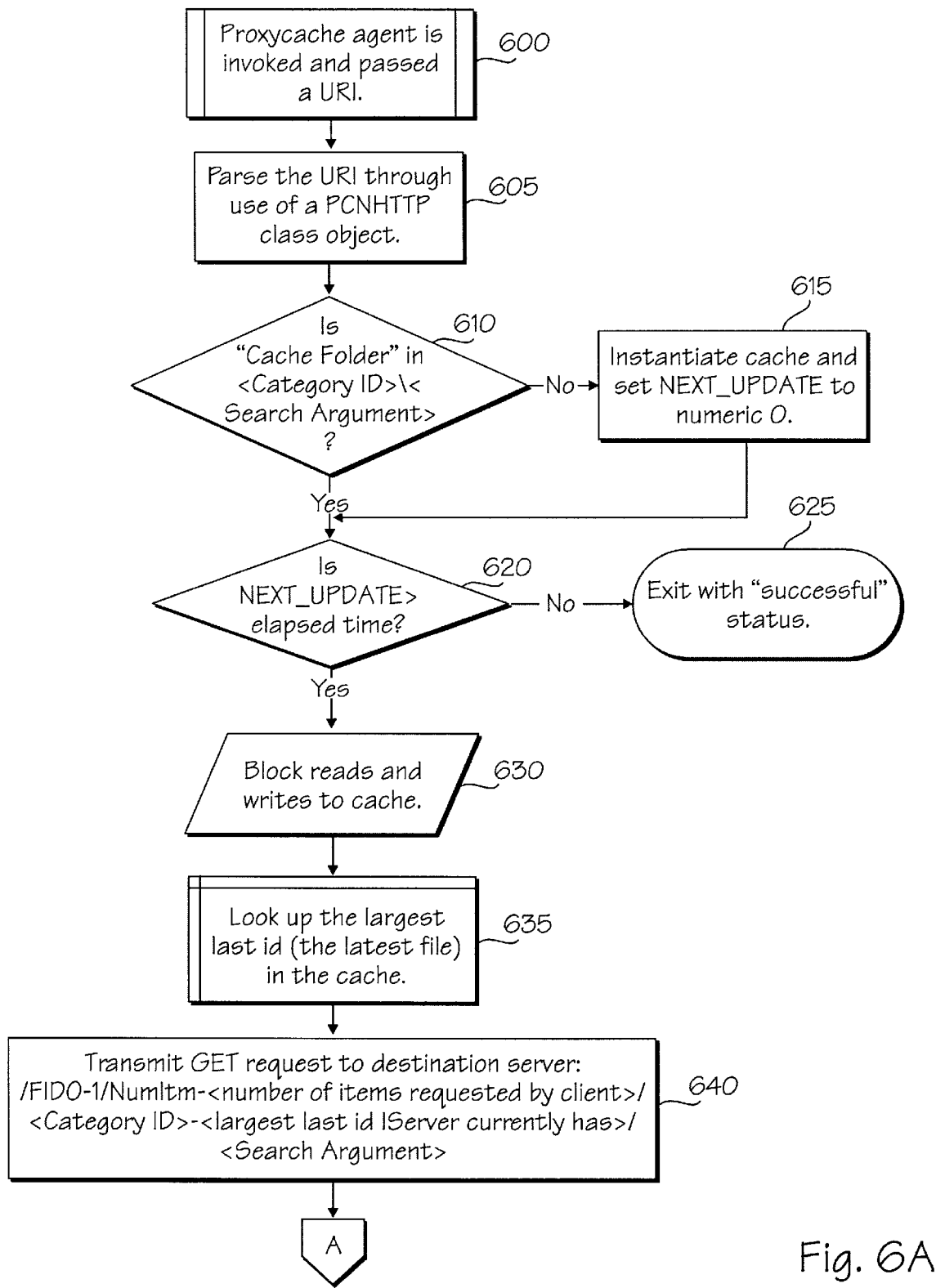
FIGS. 6A and 6B illustrate the flow-of-control of the Proxycache agent on the caching proxy server in accordance with a preferred embodiment.
Figure 6B:
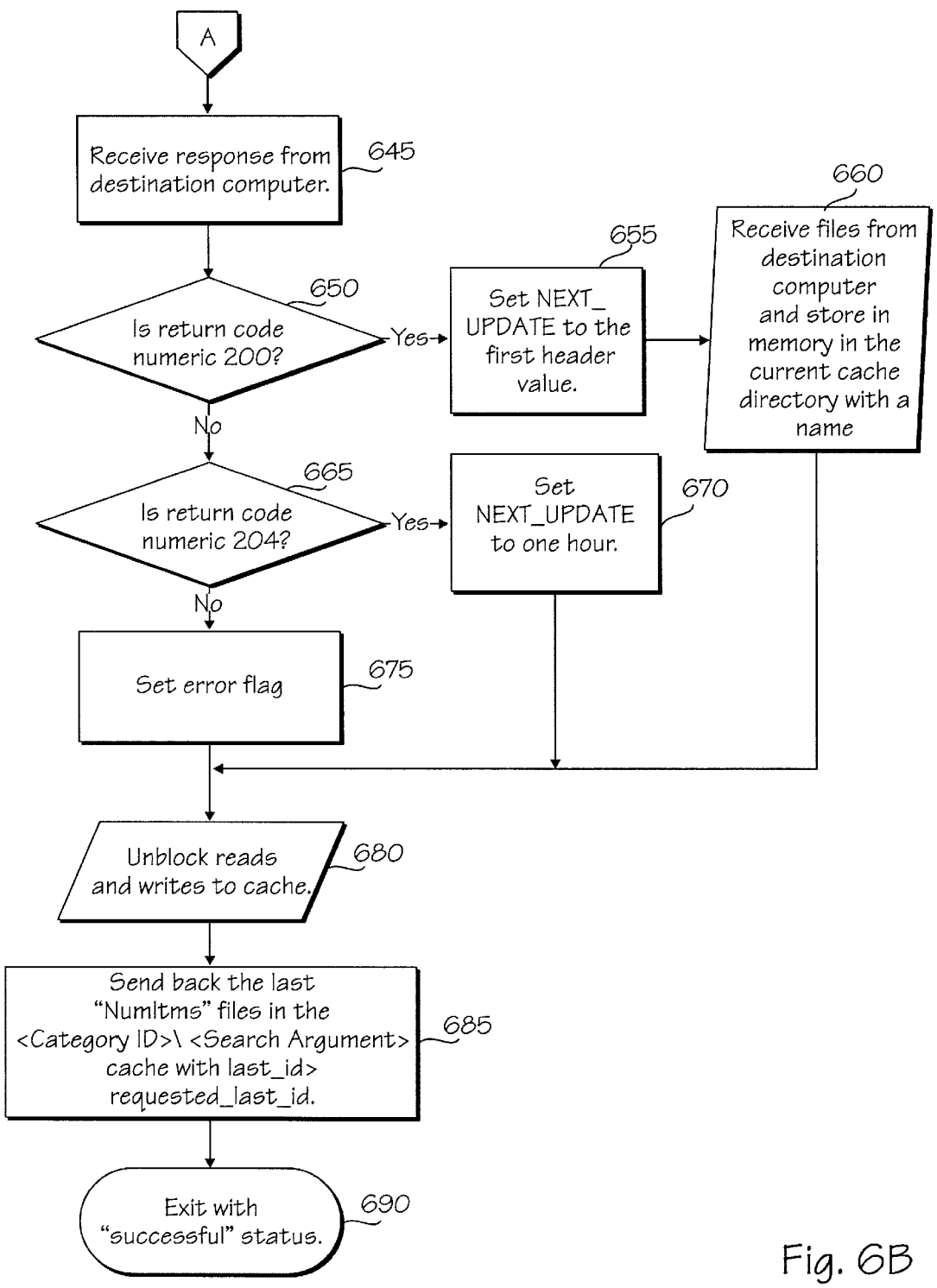

FIGS. 6A and 6B illustrate the flow-of-control of the Proxycache agent on the caching proxy server in accordance with a preferred embodiment. The primary purpose of this flow-of-control is to refresh the cache at designated intervals. Flow-of-control begins with a URI passed to the proxycache agent 600. The URI is parsed through use of a PCNHTTP class object 605 and if "Cache Folder" is not in <Category ID> \<Search Argument> 610 then a "Cache Folder" is instantiated and NEXT_UPDATE is set to numeric 0 615. If NEXT_UPDATE is not past the elapsed time 620 indicating that the cache need not be refreshed, the flow-of-control is exited with a successful status 625. If NEXT_UPDATE is past the elapsed time 620 indicating that the cache needs to be refreshed, the read and write operations to the cache are blocked 630. The largest last id (the latest file) is in the cache is identified 635 and a GET request is transmitted to the destination server in the following format: /FIDO-1/NunItm-<number of items requested by client>/<Category ID>-<largest last id caching proxy server currently has>/<Search Argument>640. The response from the destination computer is received 645.

If the return code from the response is numeric decimal 200 650, then NEXT_UPDATE is set to the first header value 655 and 0 or more files are from received from the destination computer and segmented and stored in memory in the current cache directory with a name equal to the "Last ID" associated with the file 660.

If the return code from the response is numeric decimal 204 665, NEXT_UPDATE is set to a value equivalent and representative of one hour 670, otherwise, and error flag is set indicating that the destination server did not respond to the request appropriately 675.

Read and write operations to the caches are unblocked 680, the last "Numltms" files in the <Category ID>\<Search Argument> in cache with last_id > requested_last_id are transmitted 685 and the flow-of-control is exited with a successful status 690.

Figure 7:
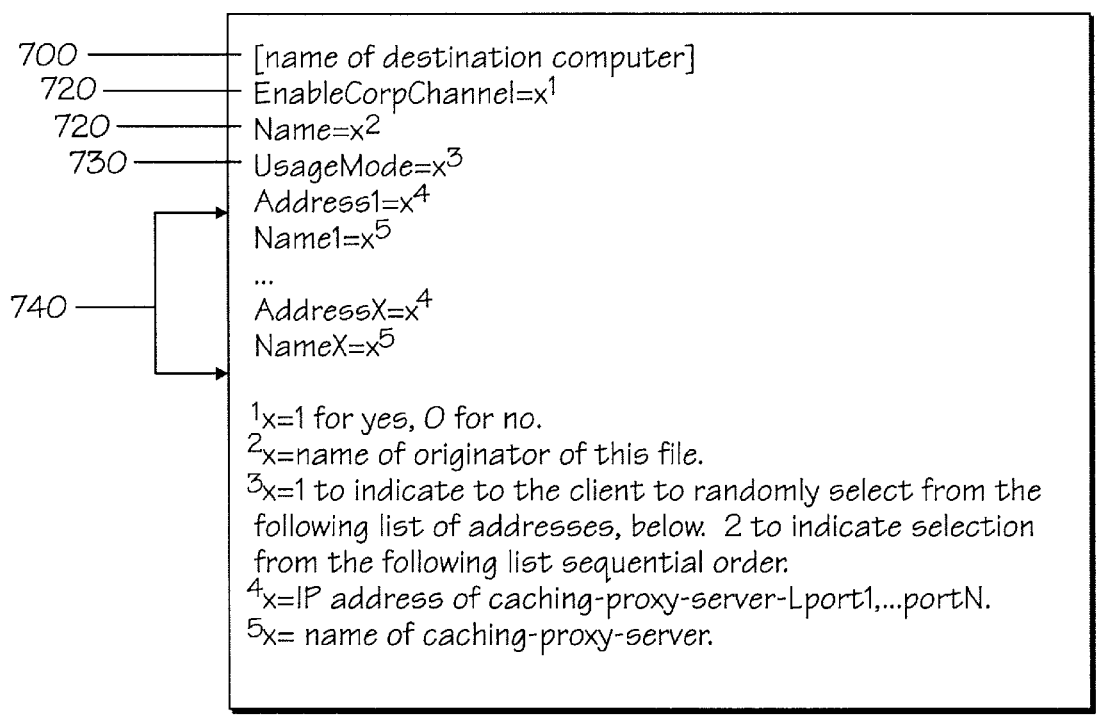
FIG. 7 illustrates the format of the 0.dc file in accordance with a preferred embodiment.

FIG. 7 illustrates the format of the 0.dc file in accordance with a preferred embodiment. A 0.dc file resides on each client computer that communicates with a caching proxy server. The data in the file is transmitted to the client from the destination computer or the redirection agent of an active caching proxy server in response to a proxy_GET request (category 66560) from the client. This file is used to identify the IP address of the caching proxy server to the client. The first entry is the name of the destination computer that transmitted the data in the 0.dc file to the client 700. The second entry is a flag indicating whether or not the private content channel is enabled 710, numeric 0 indicates no and numeric 1 indicates yes. The originator of the 0.dc file is identified at 720. The usage mode of how the following list of caching server IP addresses is to be used is indicated at 730, numeric 1 indicates that an IP address is to be selected randomly from the list by the client so that the capacity load on the caching proxy servers from the clients will be more even balanced, and numeric 0 indicates sequential selection from the list. An interative list of at least one caching proxy server address(es) follows 740. This address is used by the client computer instead of the IP address of the destination computer for HTTP GET requests so that cached data on the caching proxy server can be used to satisfy data requests, relieving the firewall of the burden of passing on the request to the destination computer and returning the data from the destination computer to the client.

FIG. 8 illustrates the format of the corp.dat file in accordance with a preferred embodiment. A private corporate channel configuration file, named corp.dat, must reside in the directory, %PCN_HOME%\corp to enable the private channel. The name of the channel, channel_name, is displayed on the channel button in the PointCast Viewer in character string format 900. SS_LOGO, the filename in logo of the GIF or JPEG format that is to be displayed in the SmartScreen FLASH_AD_LOGO and the SS_FILE line are used by the client to determine whether it needs to fetch the files specified. If the files specified by these three lines are already present on the client, it will not attempt to fetch them again. Thus, if an administrator changes one of these files, the administrator will have to change the name of the file to signal the client to fetch it again.

AD_LOGO is the character string name of the GIF or JPEG file that is to be displayed in place of the commercial while the user is in the corporate channel of the PointCast Viewer 920. SS_FILE is the character string name of the SmartScreen file selected by the MIS administrator from the list of template SmartScreens provided with the Content Server 930. This SmartScreen will be played by the client when it is time to play a SmartScreen for the corporate channel. FLASH_FILE is the character string name of the file that contains a list of messages that scroll across the ticker tape, alongside the stock quotes and sports scores 940.

GROUP is the character string name that appears on the Nth "tab" of the group directory window 950. Following the GROUP line are the description lines for all the documents in this group. All document lines that describe the same document must NOT be separated by other command lines, although blank and comment lines are allowed. DOC_SUBJECT=subjectN_M is a character string subject of the Mth document in the Nth group, as displayed in the group directory window 960. This is also the text that appears in a title sprout when the SmartScreen for this channel comes up. DOC_ID=DocIDN_M is the character string identifier (URL) used to load the source article 970. This must follow its corresponding DOC_SUBJECT line. In general, DocIDN_M takes the format of an URL as defined by W3C. DOC_SUMMARY=sumN_M is the character string HTML document that will appear as a summary sprout when the SmartScreen for this channel is intialized 980. This field usually consists of the first few paragraphs of the article, although an administrator can specify whatever he or she would like to appear as the summary sprout if the first few paragraphs are not appropriate. This must follow its corresponding DOC_ID line. DOC_SUMMARY_END denotes the end of the HTML document above 990.

The entire GROUP section 950–990 can be substituted with a single line with the following format: GROUP_FILE=location where location specifies a file which contains a GROUP section. location can either be a URL if the file exists on a remote Web server, or a full-qualified pathname if the file exists on the same machine as the the Content Server. When a client requests for a corp.dat file, the Content Server will parse the file and substitute any GROUP_FILE statements with the contents of the file identified by location before returning the corp.dat file to the client. If the Content Server is unable to locate the file in question, the entire line is ignored and a corp.dat file is generated without that particular group. A warning is signaled.

Figure 9A:
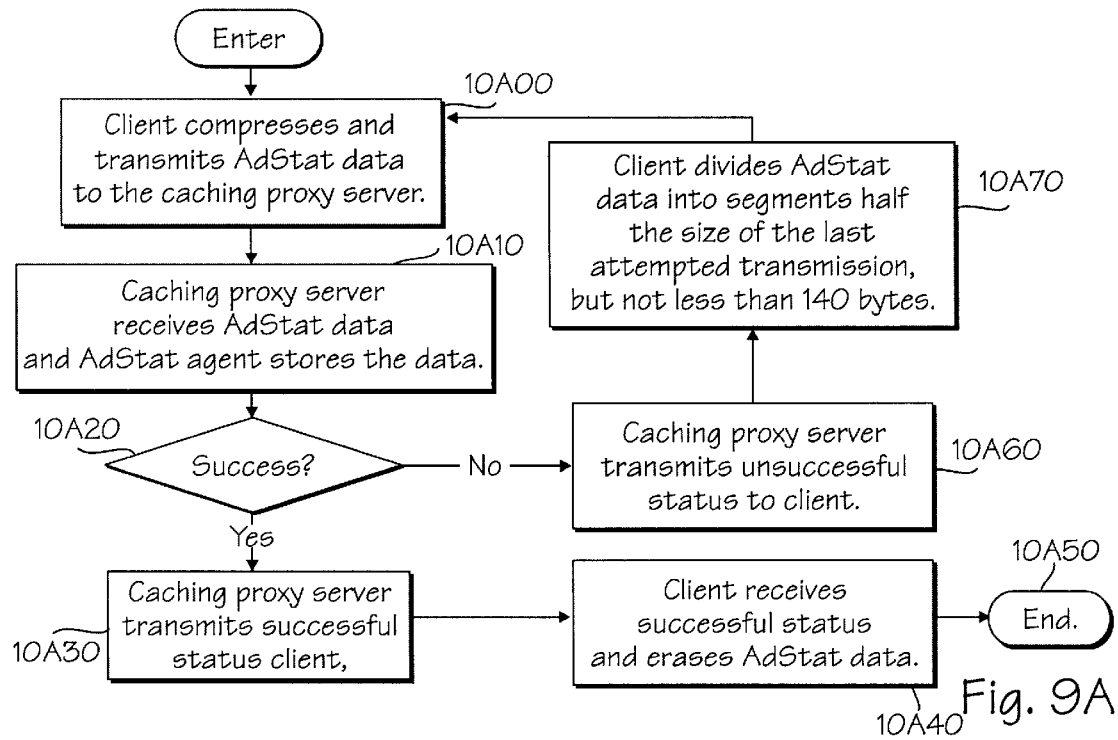
FIGS. 9A and 9B illustrates the flow-of-control of the retrieval of data Adstats data in accordance with a preferred embodiment.
Figure 9B:
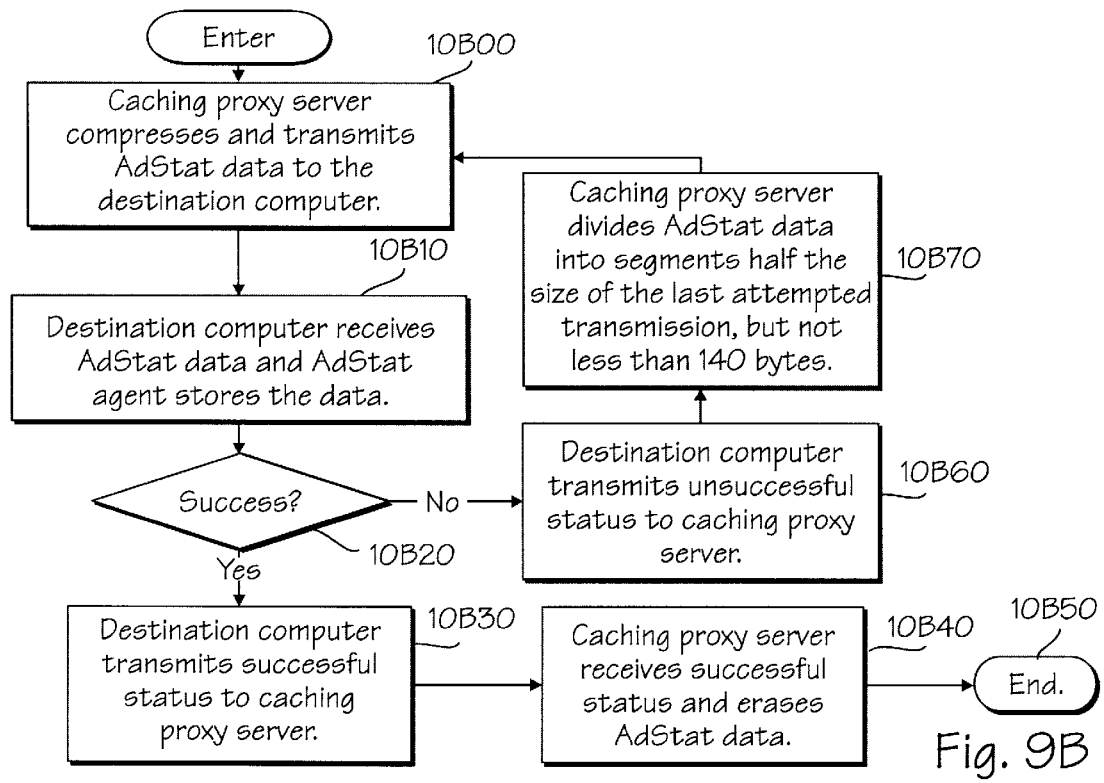

FIGS. 9A and 9B illustrate the flow-of-control of the retrieval of AdStats data in accordance with a preferred embodiment. AdStats data is statistical data on advertisements viewed by the user on the client computer. However, any other type of statistical information on usage of the client computer or content could also be involved.

To upload the AdStats data from the client to the caching proxy server, the client compresses and transmits AdStat data to the caching proxy server 10A00. The caching proxy server receives AdStat data and AdStat agent stores the data on 10A10. If the caching proxy server AdStat agent successfully received and stored the AdStat data 10A20 the caching proxy server transmits successful status to client 10A30 and when the client receives successful status, the client erases AdStat data 10A40 and the flow-of-control ends 10A50. If the caching proxy server AdStat agent did not successfully receive and store the AdStat data 10A20 the caching proxy server transmits unsuccessful status to the client 10A60, the client divides AdStat data into segments half the size of the last attempted unsuccessful transmission, but not less than 140 bytes 10A70 and the flow-of-control continues at the beginning to attempt another transmission 10A00.

To upload the AdStats data from the caching proxy server to the destination computer, the caching proxy server compresses and transmits AdStat data to the destination computer 10B00. The destination computer receives AdStat data and AdStat agent stores the data 10B10. If the destination computer AdStat agent successfully received and stored the AdStat data 10B20 the destination computer transmits successful status to caching proxy server 10B30 and when the caching proxy server receives successful status the caching proxy server erases AdStat data 10B40 and the flow-of-control ends 10B50. If the destination computer AdStat agent did not successfully receive and store the AdStat data 10B20 the destination computer transmits unsuccessful status to the caching proxy server 10B60, the caching proxy server divides AdStat data into segments half the size of the last attempted unsuccessful transmission, but not less than 140 bytes 10B70 and the flow-of-control continues at the beginning to attempt another transmission 10B00.

Figure 10:
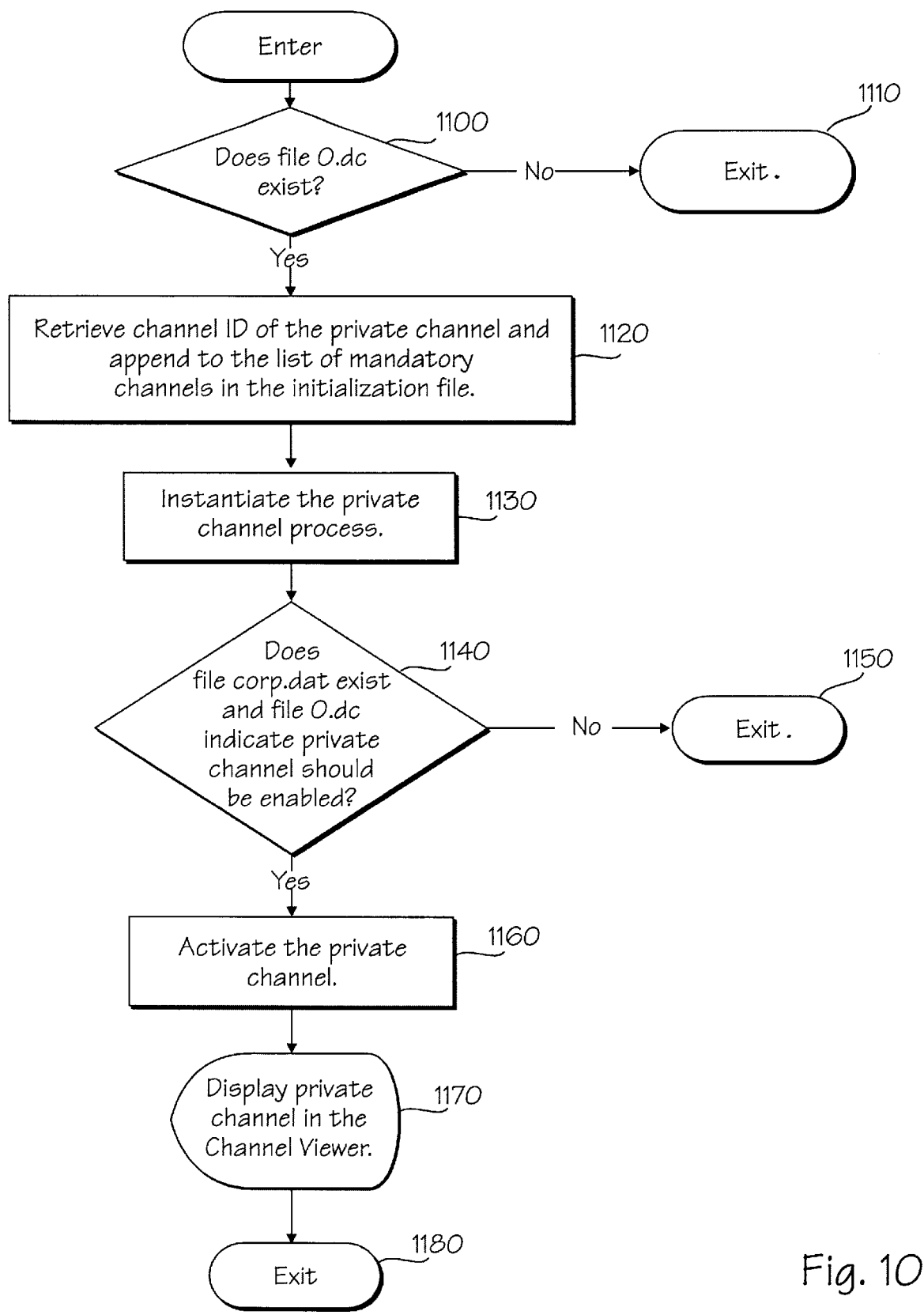
FIG. 10 illustrates the flow-of-control of establishing communication between a client and the Content Server in accordance with a preferred embodiment.

FIG. 10 illustrates the flow-of-control on a client in establishing communication between the client and the Content Server in accordance with a preferred embodiment. The Content Server enables an organization to implement an internal electronic communication infrastructure.

If file 0.dc does not exist 1100, indicating that no Content Server for the client exists, then flow-of-control terminates 1110. Otherwise, the channel ID of the private channel is retrieved and appended to the list of mandatory channels in the initialization file 1120 and the private channel DLL is instantiated 1130. If either file corp.dat does not exist or file 0.dc indicates that the private channel should not be enabled 1140, then flow-of-control terminates 1150. Otherwise, the private channel is activated 1160 and the Channel Viewer displays the private channel to indicate to the user that the private channel is active 1170 and then flow-of-control terminates 1180.

Figure 11A:
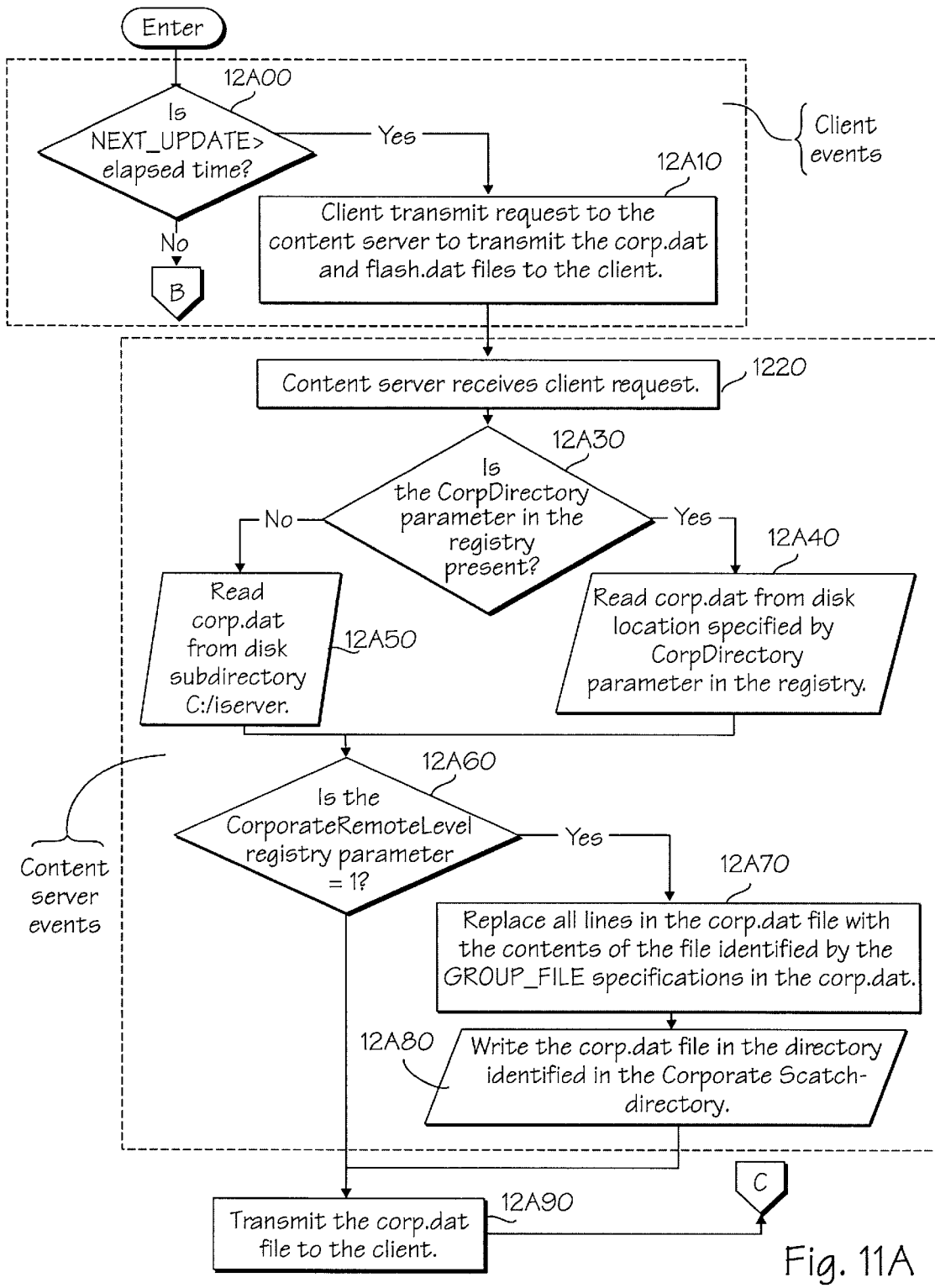
FIGS. 11A and 11B illustrate the flow-of-control of the retrieval of data by a client from the Content server in accordance with a preferred embodiment.
Figure 11B:
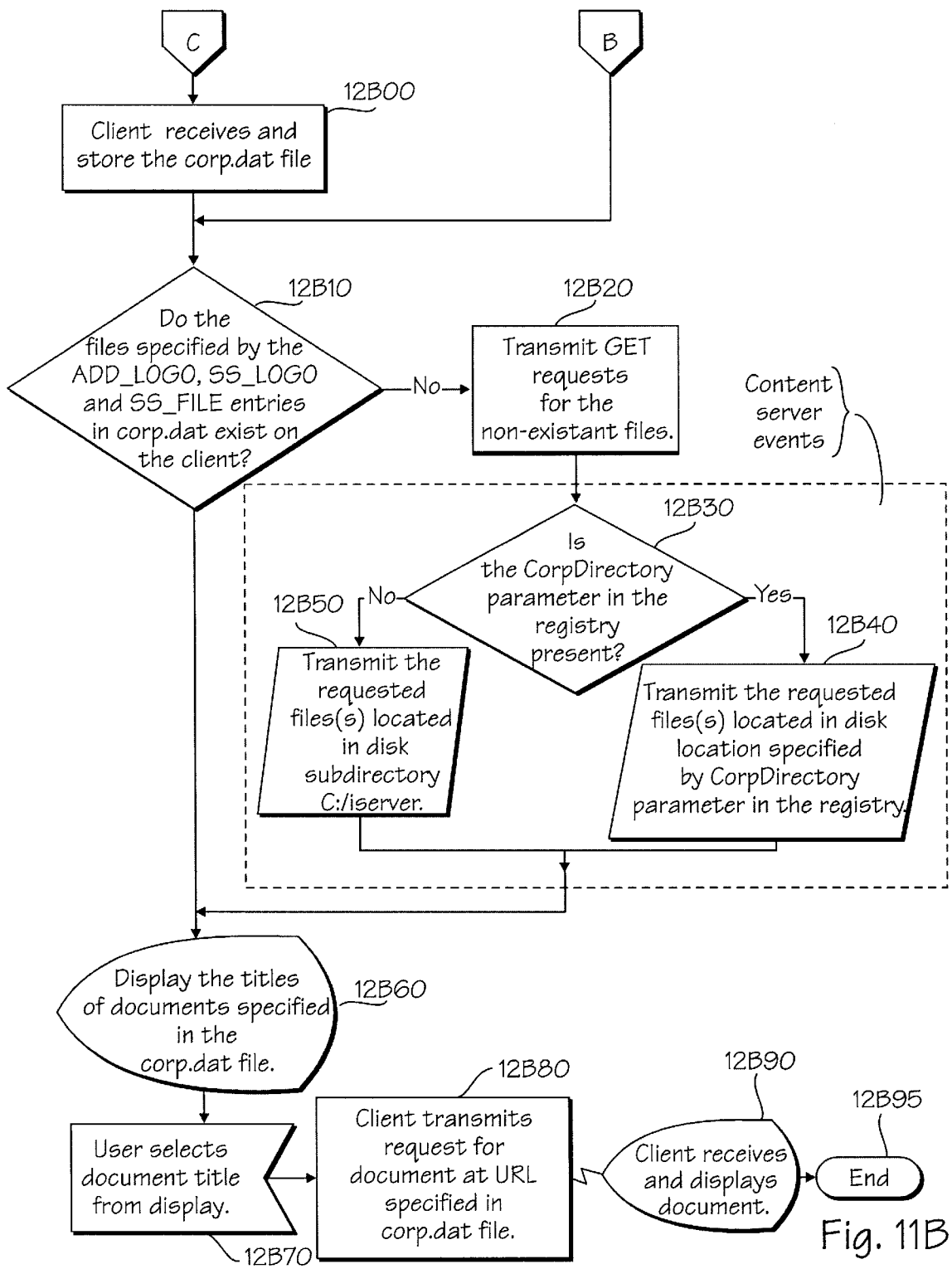

FIGS. 11A and 11B illustrate the flow-of-control of the retrieval of data by a client from the Content Server in accordance with a preferred embodiment. In order to perform a HTTP GET request, the client transmits a request to the content server to transmit the corp.dat and flash.dat files to the client.

The flow-of-control of a HTTP GET begins on the client. If the NEXT-UPDATE value has expired, 12A00, indicating that the client needs a new copy of the corp.dat file, the client transmits a request to the Content Server to transmit the corp.dat and flash.dat files to the client 12A10. When the Content Server receives the request, 12A20, if the CorpDirectory parameter in the registry on the Content Server present, 12A30, the Content Server will read the corp.dat file from the disk location specified by CorpDirectory parameter in the registry on the Content Server, 12A40, otherwise the Content Server will read the corp.dat file from disk at subdirectory C:/iserver 12A50. Then, if the CorporateRemoteLevel registry parameter on the Content Server equals numeric 1, 12A60, all lines in the corp.dat file that are name=value pairs with a name of GROUP_FILE are resolved by replacing the lines with the contents of the file identified by the value portion of the GROUP_FILE specification, 12A70, and then the corp.dat file is stored in the directory identified in the CorporateScatch-Directory 12A80. More specifically, the CorporateScratchDirectory actually contains two subdirectories, /0 and /1 referred to as cache #0 and cache #1. The Content Server always begins by serving requests for the resolved corp.dat from cache #1. As soon as the corp.dat file or a fixed time specification of minutes have elapsed, another corp.dat and its associated files are built in cache #0. While the other corp.dat file is being built in cache #0, the resolved corp.dat file in cache #1 is transmitted to clients. When cache #0 is complete, the Content Server compares the contents of the two caches. If the files have the same contents, the Content Server continues to serve clients from cache #1. If the corp.dat file contents in cache #0 and cache #0 are different, the Content Server switches all new clients to cache #0 and starts the process over by building a new corp.dat file in cache #1.

Then the Content Server transmits the corp.data file to the client 12A90. The client receives and stores the corp.dat file transmitted by the Content Server 12B00.

If the files specified by the AD_LOGO, SS_LOGO and SS_FILE entries in the corp.dat file do not exist on the client 12B10, the client will transmit GET requests to the Content Server for the non-existent files 12B20, if the CorpDirectory parameter in the registry on the Content Server present, 12B30, the Content Server will retrieve the request file(s) from the disk location specified by the CorpDirectory parameter in the registry on the Content Server and transmit the file to the requesting client, 12B40, otherwise the Content Server will retrieve the requested file(s) from disk at subdirectory C:/iserver and transmit the file(s) to the requesting client 12B50.

The client then will display through a browser the titles of documents specified in the corp.dat file 12B60. When the user selects one of the documents 12B70, the client transmits a request for the document to the computer addressed by the URL specified for the document in the corp.dat file on the client 12B80, and the client receives and displays the requested document 12B90. The flow-of-control for the retrieval of documents for the Content Server ends.

The documents that the Content Server serves to the clients may be in any format, such as ASCII text, MIME, Microsoft Word, Rich Text Format, compressed ZIP, graphics GIF or HTML. In the preferred embodiment the Content Server serves HTML files for use with a browser on the client computer.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A computer network, comprising:
   a first client computer to direct a request having categories;
   a first caching proxy server coupled to the first client computer, the first caching proxy server to receive a first data and to transmit the first data to the first client computer; and
   a destination computer coupled to the caching proxy server, the destination computer to transmit the first data to the caching proxy server, the first data to indicate which categories of the request the client computer will redirect to the caching proxy server.

2. The computer network of claim 1, wherein the client computer transmits a HTTP proxy_GET request to the destination computer to initiate the redirect.

3. The computer network of claim 1, wherein the first proxy caching server returns a second data to the destination computer based on the request.

4. The computer network of claim 1, wherein the destination computer transmits a second data to the caching proxy server, and wherein categories of the request are redirected to a second proxy caching server based on the second data.

5. A method of request handling, comprising:
   receiving a first data by a caching proxy server from a destination computer;
   transmitting the first data from the caching proxy server to a client computer, the first data to indicate which categories of a request the client computer will redirect to the caching proxy server; and directing the client request of the client computer to the caching proxy server based on the transmitted first data.

6. The method of claim 5, further comprising:

receiving the request by the caching proxy server;

processing the request; and returning a second data to the destination computer.

7. The method of claim 5, further comprising redirecting the request to a second caching proxy server by determining categories of the request that the first caching proxy server will redirect to the second caching proxy server.

8. The method of claim 5, wherein the first data is transmitted utilizing a TCP/IP compliant protocol.

9. The method of claim 5, further comprising transmitting a HTTP proxy_GET request from the client computer to the destination computer to initiate redirection.

10. An article of manufacture comprising a computer usable medium having a computer readable program code means for redirecting a client computer request of a destination computer to a caching proxy server of the client computer, all of which communicate via a network, comprising:

a first code segment for receiving a first data by the caching proxy server from the destination computer;

a second code segment for transmitting the first data from the caching proxy server to the client computer, the first data to indicate which categories of the request the client computer will redirect to the caching proxy server; and a third code segment for directing the client request of the client computer to the caching proxy server based on the transmitted first data.

11. The article of manufacture as recited in claim 10, further comprising a fourth code segment for receiving the request by the caching proxy server, and for processing the request and returning a second data to the destination computer.

12. The article of manufacture as recited in claim 10, further comprising a third code segment for redirecting the request to a second caching proxy server by determining categories of the request that the first caching proxy server will redirect to the second caching proxy server.

13. The article of manufacture as recited in claim 10, wherein the network utilizes a TCP/IP compliant protocol for transmitting the first data.

14. The article of manufacture as recited in claim 10, further comprising a fourth code segment for transmitting a HTTP proxy_GET request from the client computer to the destination computer to initiate redirection.

15. The article of manufacture as recited in claim 10, wherein the client and the caching proxy server have a private channel for sharing private data.

\* \* \* \* \*